United States Patent
Calcagno et al.

[15] 3,671,576

[45] June 20, 1972

[54] PROCESS FOR PREPARING OLEFIN ESTERS

[72] Inventors: Benedetto Calcagno; Luciano Cairati, both of Milan, Italy

[73] Assignee: Societa'Italiana Resine S.p.A., Milan, Italy

[22] Filed: April 22, 1968

[21] Appl. No.: 723,311

[30] Foreign Application Priority Data

April 29, 1967 Italy.................................15536 A/67

[52] U.S. Cl.......................................260/497 A, 252/411 R
[51] Int. Cl...........................................................C07c 67/04
[58] Field of Search...............................................260/497 A

[56] References Cited

UNITED STATES PATENTS 3,492,340   1/1970   Aguilo et al. ............................260/497
3,455,989   7/1969   Kutepow et al........................260/497

Primary Examiner—Lorraine A. Weinberger
Assistant Examiner—Richard D. Kelly
Attorney—Sughrue, Rothwell, Mion, Zinn & Macpeak

[57] ABSTRACT

A process for preparing unsaturated esters from olefins and carboxylic acids is provided, in which the catalytic reaction medium is regenerated by precipitating the catalytic salts as carbonates, recovering them, and re-dissolving them in the acid for return to the reaction.

11 Claims, No Drawings

PROCESS FOR PREPARING OLEFIN ESTERS

The present invention relates to processes for the preparation of unsaturated esters from olefines.

As is already known, it is possible to obtain unsaturated esters by bringing an olefine into contact with a palladium salt in a reaction medium comprising a carboxylic acid, generally containing a small quantity of water, and in the presence of a salt of the acid which is capable of being ionized under the reaction conditions.

The reaction medium also comprises a copper salt (or sometimes an iron salt); the resulting redox catalytic system is then regenerated by molecular oxygen introduced into the reaction medium.

In the preparation of vinyl acetate, which is the most important unsaturated ester, ethylene, mixed with oxygen or a gas containing oxygen, is brought into contact with a solution or a suspension of catalyst salts in acetic acid.

In general, the catalyst-containing reaction composition is obtained by adding palladium and copper or iron in the form of chlorides to a carboxylic acid of 75 to 85 percent w/v strength, while the salt of the acid, ionizable under the reaction conditions, is formed by acetates of alkali and/or alkaline earth metals.

It is also possible to add a part of the copper in the form of the acetate, while the alkali and alkaline earth metals can be introduced, at least in part, in the form of chlorides.

It is also known that a decrease in the activity of the catalyst is observed during the progress of the reaction for converting the olefine into unsaturated esters. This phenomenon, which becomes increasingly apparent in course of time, can end in a complete stoppage of the reaction.

The phenomenon is accompanied by two other concurrent phenomena which are firstly, the formation of organic products with a high boiling point, and secondly, the decrease in the content of chlorine in the catalyst composition, because of elimination of the chlorine in the form of volatile chlorides.

In a series of experimental tests, it has been found that the best possible conversion rates are obtained, all other factors being equal, when the content of chlorine in the catalyst composition is between approximately 0.5 and 3.0 percent by weight.

Consequently, for good progress of the conversion reaction of the olefines, it is necessary either to regenerate the metallic chlorides, and to prevent the formation in the reaction mixture of organic products with a high boiling point.

Various processes for regenerating these catalysts are known from the prior art, which consist in a preventive combustion intended to eliminate the products of high boiling point, with simultaneous transformation of the palladium salts into metallic palladium and of the copper salts into the corresponding oxide.

Finally, the metal chlorides are regenerated by an appropriate treatment of the residues from the combustion.

The aforesaid process nevertheless has various disadvantages, such as the complexity of the apparatus, the serious corrosion problems associated with a medium brought to a temperature of 400°–500° C. and the inevitable losses due, for example, to the volatility of the copper salts.

We have found that it is possible to prepare unsaturated esters from olefines, and particularly vinyl acetate from ethylene, by a simple and economic process which has the advantage of maintaining, in the reaction medium, a low level of organic products of high boiling point, and a level of chlorine within suitable limits, so as to maintain the best possible conditions for the conversion reaction of the olefines.

The invention accordingly provides a process for preparing an unsaturated ester from an olefin and a carboxylic acid, by contacting a gaseous mixture of an olefin and an oxygen-containing gas with a reaction medium comprising catalytic salts contained in the carboxylic acid, characterized in that the said reaction medium at least in part is withdrawn from the reaction and regenerated by first removing the carboxylic acid, second recovering the salts as precipitated carbonates and third reconverting the salts to the catalytic form and returning them to the reaction.

The process is essentially based on the fact that it is possible to separate the salts of palladium, copper and alkaline-earth metals in the form of insoluble carbonates, preferably after having eliminated the carboxylic acid from the spent catalyst composition, by precipitation at a pH value controlled preferably by a concentrated aqueous solution of alkaline carbonates, while the organic products of high boiling point (glycols, oxy acids, polyalcohols, etc.) remain dissolved in the aqueous phase and can thus be eliminated, for example, by filtration.

Preferably, the catalyst salts are regenerated by dissolving the carbonates in the carboxylic acid, and then adding hydrochloric acid in a quantity such that the chlorine content of the catalyst composition is maintained within the desired limits.

For carrying the present process into effect, the mixture of gaseous olefine and oxygen, suitable in a volumetric ratio which is between 19 and 25 to 1, is brought into contact, for example in a tubular reactor, with catalyst salts dissolved in a carboxylic acid medium such as acetic acid. In the preferred of the invention, the gases are introduced at a speed which is between 150 and 250 volumes per hour per volume of the reaction medium, the reaction temperature being between 100° and 110° C. and the pressure being maintained at a value which is between 15 and 40 atmospheres.

The reaction medium is obtained by metal salts being dissolved in the carboxylic acid, preferably as an aqueous solution of 75 to 85 percent w/v carboxylic acid, so as to obtain the following preferred concentrations:

| | |
|---|---|
| Alkaline-earth acetate | 0.7–1.2 mole/liter |
| Cupric chloride | 0.3–0.5 mole/liter |
| Palladium chloride | 0.005–0.01 mole/liter |

Among the alkaline earth salts, those which are particularly preferred are the barium salts, which can be introduced, wholly or at least in part, into the reaction medium in chloride form.

While maintaining the concentrations of the metals within the limits indicated, it is possible to introduce a part of the copper in acetate form.

For the regeneration of the catalyst, which can be effected either continuously or intermittently, a start is preferably made by eliminating the largest possible part of the carboxylic acid by heating under vacuum.

The residue from the distillation is then taken up in water and, while controlling the pH value, the concentrated aqueous solution of an alkali carbonate is added. Finally, the pH is adjusted to a value which is between 8 and 8.5 and a precipitate is obtained consisting of palladium, copper and barium carbonates.

The organic products with a high boiling point are thus separated from the precipitate of catalysts in the form of an aqueous solution.

Thereafter, the percipitate of the carbonates is dissolved in acetic acid, with addition of hydrochloric acid.

The quantity of acetic acid and its strength, as well as the quantity of hydrochloric acid, are such that there is obtained in the reaction medium a catalyst composition remaining within the range of the compositions indicated above.

The following example illustrates the invention. It is preceded by a comparative run without regeneration.

COMPARATIVE RUN

To 1,000 parts by weight of aqueous acetic acid with a strength of about 85 percent w/v, there are added 0.8 parts by weight of palladium chloride, 56 parts of cupric chloride and 315 parts of barium hydroxide of formula $Ba(OH)_2 \cdot 8H_2O$. 7.5 liters of this catalytic solution are introduced into an enamelled tubular reaction, to the base of which is delivered 1,500 liters per hour of a gaseous mixture formed of 95 percent of ethylene and 5 percent by volume of oxygen.

The reaction is effected at approximately 107° C. under a pressure of about 30 atmospheres.

The gases leaving the top of the reactor are cooled and a liquid product is separated out by condensation of these gases in a gas-liquid separator.

During a running period of 30 hours 71 g. per hour acetaldehyde and 76 g. per hour of vinyl acetate are obtained, per liter of volume of the reactor.

EXAMPLE

Into a 2-liter glass reactor, there is introduced the catalyst solution obtained after the reaction period of 30 hours of the comparative run, with a chlorine content equal to 0.5 percent by weight. Heating is effected under vacuum in order to eliminate the major part of the acetic acid.

The residue is taken up in 1 liter of water, and neutralized with a 20 percent w/v sodium carbonate solution. The pH value is brought to 8 to 8.5, and a precipitate is obtained which is formed by the carbonates of barium, palladium and copper, this precipitate being separated by filtration.

The filtrate, which is an aqueous solution of organic compounds of high boiling point, is discharged.

The carbonates thus obtained are treated with 530 ml. of 37 percent w/v hydrochloric acid, and the composition, to which are added 1,500 ml. of 99 percent acetic acid is reintroduced into the reaction medium.

Under the conditions of the comparative run, the ethylene conversion reaction is continued for another 30 hours. 70 g. per hour of acetaldehyde and 70 g. per hour of vinyl acetate are respectively produced, per liter of volume of the reactor.

What is claimed is:

1. A process for producing vinyl acetate in a reaction zone wherein vinyl acetate is formed by reacting ethylene with acetic acid in the presence of oxygen and a catalytic mixture comprising palladium, copper and alkaline earth metal salts in aqueous acetic acid, and wherein the catalyst becomes spent from the formation of vinyl acetate, and requires regeneration, the improvement comprising:
   a. withdrawing a portion of the spent catalytic mixture from the vinyl acetate reaction zone;
   b. distilling acetic acid from the spent catalytic mixture to yield a distillation residue;
   c. adding the distillation residue to water;
   d. combining the product of step (c) with an aqueous solution of at least one alkali carbonate to provide a pH between 8 and 8.5 to thereby yield a precipitate comprising the metals of said catalytic mixture in the form of insoluble carbonates and a liquid phase;
   e. separating the insoluble carbonates from the liquid phase;
   f. dissolving the carbonates in a mixture comprising acetic acid and hydrochloric acid to re-establish the regenerated catalytic mixture; and
   g. re-introducing the regenerated catalytic mixture into said vinyl acetate reaction zone.

2. The process of claim 1 wherein the ethylene and oxygen or molecular oxygen containing gas is supplied to the vinyl acetate reaction zone in a volumetric ratio between 19 and 25 to 1 at a rate of from 150 to 250 volumes to one volume of the catalyst mixture per hour, the reaction temperature is between 100° and 110° C. and the reaction pressure is between 15 and 40 atmospheres.

3. The process of claim 1 where step (b) is under vacuum and the liquid phase of step (d) is an aqueous phase, further wherein the palladium salt, copper salt and alkaline earth metal salts in the spent catalytic mixture of step (a) are in solution.

4. The process of claim 1 wherein said regenerated catalytic mixture has a chlorine content in the range of approximately 0.5 to 3.0 percent by weight.

5. The process of claim 4 wherein said spent catalytic mixture further contains high boiling side-products resulting from the formation of vinyl acetate and further wherein the high boiling side-products are retained in the liquid phase of step (e), and thereby separated from the catalytic mixture prior to re-introduction into said vinyl acetate reaction zone.

6. The process of claim 1 wherein said regenerated catalytic mixture comprises, per liter of the aqueous acetic acid present therein:
   0.7 to 1.2 mols of the alkaline earth metal salt;
   0.3 to 0.5 mols of the copper salt; and
   0.005 to 0.10 mols of the palladium salt.

7. The process of claim 6 where the catalyst mixture in the reaction zone comprises, per liter of the aqueous acetic acid present therein, from 0.7 to 1.2 mols of the alkaline earth metal salt, from 0.3 to 0.5 mols of the copper salt, and from 0.005 to 0.10 mols of the palladium salt, and where the catalyst mixture in the reaction zone has a chlorine content in the range of approximately 0.5 to 3.0 percent by weight.

8. The process of claim 6 wherein the alkaline earth metal salt is selected from the group consisting of an acetate, a chloride and a mixture of an acetate and a chloride, the copper salt is selected from the group consisting of a chloride, an acetate and mixtures thereof, and the palladium salt is the chloride.

9. The process of claim 8 wherein the alkaline earth metal is barium.

10. The process of claim 6 where the alkaline earth metal salt is the acetate and the copper salt is the chloride.

11. The process of claim 10 where the alkaline earth metal is barium.

* * * * *